(12) United States Patent
Lombas

(10) Patent No.: US 9,296,627 B1
(45) Date of Patent: Mar. 29, 2016

(54) OIL SPILL RECOVERY APPARATUS AND METHOD

(76) Inventor: Leslie Lombas, Mandeville, LA (US)

( * ) Notice: Subject to any disclaimer, the term of this patent is extended or adjusted under 35 U.S.C. 154(b) by 1173 days.

(21) Appl. No.: 13/107,358

(22) Filed: May 13, 2011

Related U.S. Application Data

(63) Continuation-in-part of application No. 12/882,197, filed on Sep. 14, 2010, now Pat. No. 8,658,045.

(60) Provisional application No. 61/345,060, filed on May 14, 2010, provisional application No. 61/241,992, filed on Sep. 14, 2009.

(51) Int. Cl.
C02F 1/00 (2006.01)
C02F 1/40 (2006.01)
E02B 15/04 (2006.01)
B01D 61/00 (2006.01)
C02F 103/06 (2006.01)
C02F 101/32 (2006.01)

(52) U.S. Cl.
CPC . *C02F 1/40* (2013.01); *B01D 61/00* (2013.01); *C02F 2101/32* (2013.01); *C02F 2103/06* (2013.01)

(58) Field of Classification Search
None
See application file for complete search history.

(56) References Cited

U.S. PATENT DOCUMENTS

| | | | |
|---|---|---|---|
| 3,237,774 A | 3/1966 | Schuback | |
| 3,684,095 A * | 8/1972 | Ayers | 210/242.3 |
| 3,704,784 A * | 12/1972 | Craggs et al. | 210/242.3 |
| 3,708,070 A | 1/1973 | Bell | |
| 3,754,653 A | 8/1973 | Verdin | |
| 3,756,031 A * | 9/1973 | Smith et al. | 405/66 |
| 3,822,789 A | 7/1974 | Crisafulli | |
| 3,860,519 A | 1/1975 | Weatherford | |
| 3,966,615 A | 6/1976 | Petchul et al. | |
| 4,054,525 A | 10/1977 | Propp | |
| 4,426,288 A | 1/1984 | Munte | |
| 4,511,470 A | 4/1985 | Ayroldi | |
| 4,554,070 A | 11/1985 | Jordan | |
| 4,795,567 A | 1/1989 | Simpson et al. | |
| 5,019,277 A * | 5/1991 | Andelin | 210/776 |
| 5,022,987 A | 6/1991 | Wells | |
| 5,043,065 A | 8/1991 | Propp | |
| 5,047,156 A | 9/1991 | Sullivan | |
| 5,135,666 A * | 8/1992 | Lucas | 210/776 |
| 5,158,673 A | 10/1992 | Halter | |
| 5,194,164 A | 3/1993 | Adams | |
| 5,308,510 A | 5/1994 | Gore | |
| 5,478,483 A | 12/1995 | Gore | |
| 5,753,108 A * | 5/1998 | Haynes et al. | 210/122 |
| 5,792,350 A | 8/1998 | Sorley et al. | |
| 6,251,286 B1 | 6/2001 | Gore | |
| 2003/0010685 A1* | 1/2003 | Michel, Jr. | 210/86 |
| 2005/0260037 A1 | 11/2005 | Nilsen | |
| 2006/0138060 A1 | 6/2006 | Salmi et al. | |
| 2006/0201867 A1 | 9/2006 | Garcia | |

* cited by examiner

*Primary Examiner* — Nam Nguyen
*Assistant Examiner* — Richard Gurtowski
(74) *Attorney, Agent, or Firm* — Joseph T Regard Ltd plc

(57) ABSTRACT

A pollutant collector retrofit for a marine vessel or the like for collecting and removing pollutants from the surface of a body of water, and in particular a modular skimmer system configured to be mounted to the hull of a conventional marine vessel, to facilitate same for use in oil spill skimming operations or the like. The present invention also includes a method for converting a marine vessel for use in skimming operations, utilizing a unique skimmer system configured for mounting to one or both outer sides of a marine vessel, along its hull.

10 Claims, 6 Drawing Sheets

OIL SPILL RECOVERY APPARATUS AND METHOD

DOMESTIC PRIORITY DATA AS CLAIMED BY APPLICANT

The present application claims the benefit of Provisional Application 61/345,060 filed May 14, 2010, entitled "Oil Spill Recovery Apparatus and Method", listing Leslie Lombas as inventor, the contents of which are incorporated herein by reference thereto.

The present application is a continuation-in-part of U.S. patent application Ser. No. 12/882,197 filed Sep. 14, 2010 now U.S. Pat. No. 8,658,045, entitled "Oil Spill Recovery Vessel and Method Therefore", which claims the benefit of U.S. Provisional Patent Application Ser. No. 61/241,992, filed Sep. 14, 2009, the contents of which are incorporated herein by reference thereto.

GENERAL FIELD OF THE INVENTION

The present invention relates to oil skimmer systems and the like for removing pollutants from the surface of a body of water, and in particular to a modular skimmer system configured to be mounted to the hull of a marine vessel, to facilitate its use in spill clean-up operations. The present invention also teaches a method for converting a marine vessel for skimming operations utilizing a unique skimmer system configured for mounting to one or both outer sides of a marine vessel, along its hull.

GENERAL DISCUSSION OF THE INVENTION

The present invention relates to apparatus for recovery of surface contaminants, such as liquid hydrocarbons or the like floating upon a body of water, and in particular to an oil spill recovery apparatus and method of use therefore.

The preferred embodiment of the invention contemplates an oil skimmer system adapted for mounting to an marine vessel with nominal modification.

The preferred embodiment of the skimmer component of the present invention utilizes a pickup wing pivotally mounted to a framework adapted to mount to a commercial marine vessel or the like, so as to, in effect, retrofit the vessel for hydrocarbon spill recovery operations. A single unit can be mounted to one side of the vessel, or two units can be mounted to opposing sides of the vessel, respectively, with each unit positioned and configured to collect the hydrocarbon or other material from the surface of the water along side of the vessel, and direct the oil to an associated pickup wing.

The pickup wing is dynamically repositionable, in the preferred embodiment of the invention, by an operator (although automated controls are envisioned). The pickup wing may be supported via opposing tracks at each end, and utilizing first and second hydraulic pistons situated at the front and rear of the wing, respectively, to vertically position, in independent fashion, the front and rear of the wing at the optimal position for skimming the material from the water surface.

The system may thus be vertically positioned the unit in real time, such that the front of the pickup wing is situated just below the water surface, to provide maximum collection of contaminants (in this case, hydrocarbons) floating thereupon.

Two swing-mounted collection booms are preferably situated on opposing sides of the forward, outer section the framework supporting each deployed wing, the collection booms being pivotally adjustable, and selectively deployable, to direct surface contamination to the collection area.

The pickup wing is configured such that fluid motion over the its forward section, either from vessel motion or fluid current, provides a skimming action, so as to urge the surface contaminants over the wing and into a recovery area, where it is separated from the water and pumped into a collection tank.

The present invention thereby provides:

1) a pivotally and vertically adjustable pickup wing formed to remove surface contaminants from a body of water;

2) a support framework providing a forward collection area having an opening with a pickup wing therein to form a forward skimming surface, which pickup wing vertically adjustable vis a vis the water surface to facilitate highly effective collection of surface contaminants with minimum collection of non-contaminated water;

3) said vessel incorporating swing booms associated with opposing outer front ends of the wing and/or the supporting framework, said booms being selectively positionable to direct surface contaminants on a body of water into the collection area situated therebetween (FIG. 5);

4) said booms may be in the form of boom extensions supported by the vessel, or may include independent boom extensions which are able to be positioned and towed by independent, remotely controlled vessels, so as to extend the collection capabilities of the system.

The preferred embodiment of the present invention is thus designed to provide a system for retrofitting various marine vessels including offshore supply boats, crew boats, services boats, etc, expanding said vessels to a heretofore unexploited use. Alternatively, the performance of the system may be further enhanced by designing a marine vessel which incorporates the features of the present invention in its base design.

The present invention thus provides industry with an effective and economical means of addressing environmental concerns that now hamper the development of oil and gas reserves along the East and West coast continental shelves of North America, as well as the Gulf of Mexico and coast of Florida. The present system may also provide to the petroleum industry the technological and political leverage it needs to gain access to these vital areas.

The preferred embodiment of the system of the present invention thus provides, for the first time ever, an effective system to quickly retrofit various commercial vessels for use in skimming operations in the event of an oil spill or other environmental catastrophe requiring recovery of a contaminant from the surface of a body of water.

BRIEF DESCRIPTION OF DRAWINGS

For a further understanding of the nature and objects of the present invention, reference should be had to the following detailed description, taken in conjunction with the accompanying drawings, in which like parts are given like reference numerals, and wherein.

DETAILED DISCUSSION OF THE INVENTION

Figure 1:
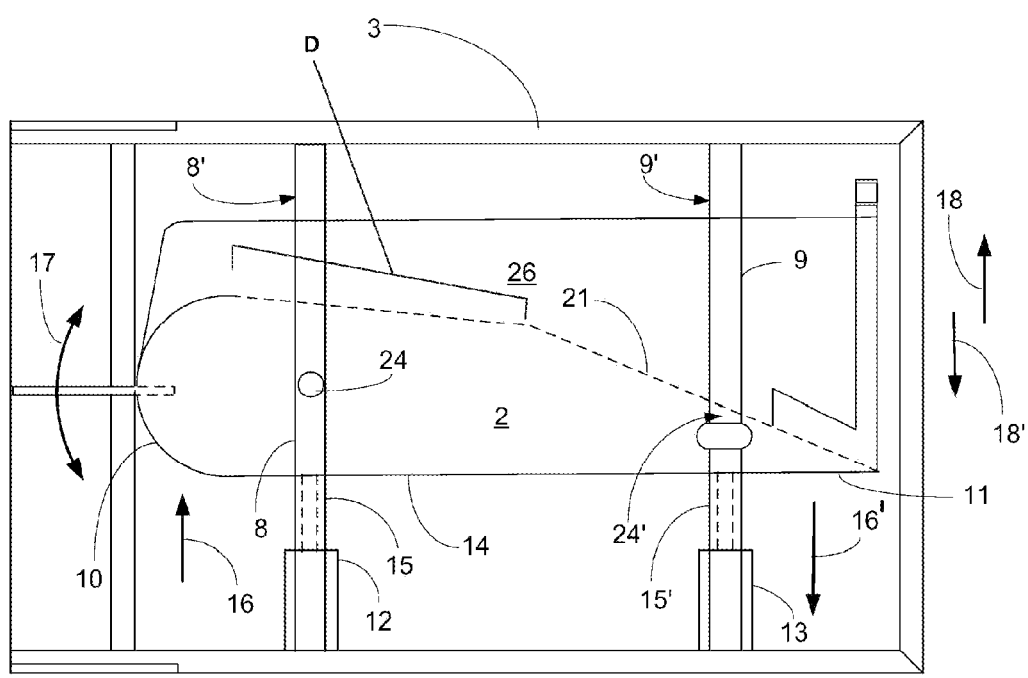
FIG. 1 is a side, partially cut-away view of the exemplary embodiment of the present invention, illustrating the oil pickup wing situated in the system framework, as well as the hydraulic positioners, the system designed for retrofit to conventional marine vessels on a temporary basis for oil spill clean-up operations.

The preferred embodiment of the present invention contemplates an oil wing pickup system designed for quick retrofit, even on a temporary basis, to the hull of various marine vessels.

In the event of an oil spill or the like on a body of water, a preferred embodiment of present system contemplates a skimmer module configured for fitting to one side of a commercial vessel such as an offshore supply boat, crew boat, coast guard vessel, or other vessel without significantly alterations to the vessel, and in a manner which would allow the vessel and crew to initiate oil spill clean-up operations without significant additional support from outside sources, or significant training. Further, a second skimmer module can be mounted to the other side of said vessel, opposite said first skimmer module. Collection tanks, separation systems, pumps, power packs, etc, can be provided on the deck of the vessel for controlling, powering and collecting contaminants from the skimmer modules as they operate. The primary advantage of this system is its unparalleled response time potential, and at substantially decreased costs when compared to traditional, dedicated skimmer systems.

The cost effectiveness of the present system is such that a multitude of the devices of the present invention can be fabricated and stored before any disaster, and, when needed, quickly mounted to whatever available vessels are in the vicinity, so as to provide a an appropriately sized flotilla of retrofitted vessels to combat the disaster.

Referring to the Figures, the oil pick-up wing 2 of the present invention is housed in a supporting framework 3 which is configured to be mounted to the (preferably rear portion of) side section 4 of the hull 5 of a marine vessel 6. This can be done, for example, via brackets or the like engaging framework 3 to the hull, upper sidewall, and/or deck of the vessel. The wing 2 is mounted to front 8, 8' and rear 9, 9' track sections supported by framework at opposing 7, 7' side edges of the wing, near the front 10 and rear 11 ends of the wing 2.

As shown, rods 24, 24' extend from the sides of the wing to engage a respective track section 8, 9 supported via framework 3. First 12 and second 13 hydraulic positioners, the present, illustrated embodiment utilizing hydraulic pistons, pivotally engage (via "C" brackets or the like) the underside 14 of the wing near the front 10 and rear 10' ends, respectively, so as to provide, via selective extension 16 and retraction 16' of rams 15, 15', the wing 2 the ability to adjust the pitch 17, and selectively move the front and rear ends of the wing move up 18 or down 18', repositioning the upper surface of the wing so as to adjust to changing sea conditions for optimal skimming of the contaminant from the surface of the water body.

Continuing with the figures, first and second opposing vertical walls 26, 26' emanate upwardly from the opposing side edges 7, 7' of the wing to facilitate collection of the oil or other contaminate over the front surface of the wing to the collection in the rear.

The front end 10 of the wing comprises a radial curved edge to form a symmetrical, radial front end, and may be formed of pipe or the like, for example, 36" casing or roll plate pipe with ½" wall, for a wing 14 to 18 feet along (from the front 10 to rear 10' ends with longitudinal axis 27 therebetween) and six feet wide, (from side edge 7 to side edge 7').

For example, 3" rod may be used to guide the opposing side edges of the wing in their respective tracks, the tracks being ideally lubricated and having, for example, a close clearance (example, about ⅛" side to side and end clearance). The above described components situated within framework 3 thereby forms the skimmer module for mounting to the vessel, as will be further discussed herein.

An exemplary marine vessel for the present system might comprise, for example, a 165' supply vessel or crew boat. The frame of the present invention may be affixed to the side hull of the vessel via, for example, a mount formed of angle iron or the like which may be welded to or affixed via threaded fasteners or the like to the hull, and a "T" bar may engage the vessel mounts to support the frame.

The wing 2 of the preferred embodiment of the present invention is formed, positioned, and operated so as to create a pressure wave W in the vicinity of the front edge 10 of the wing as it moves forward thru the water. In actual operation, the wing is lowered to just below the surface of the water. The vessel 6 moves forward 19 (the speed varies but for calm seas about 5-7 knots, for example) and as speed increases the water pressure increases on the surface of water in front of the wing and against the radial curved edge forming the front end 10, creating pressure wave W.

Figure 1A:
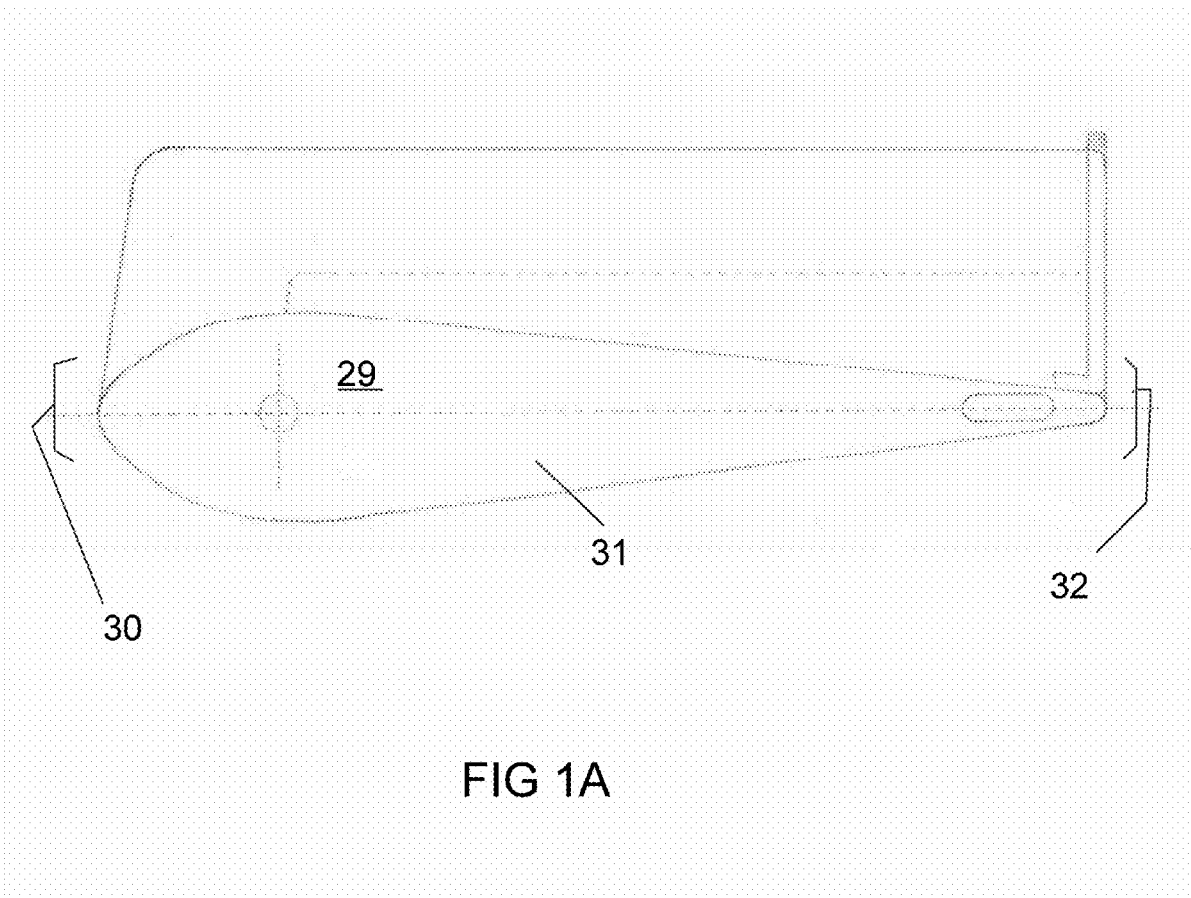
FIG. 1A is a side, partially cut-away view of the invention of FIG. 1, illustrating a "teardrop" alternative, configuration of the pickup wing.
Figure 2:
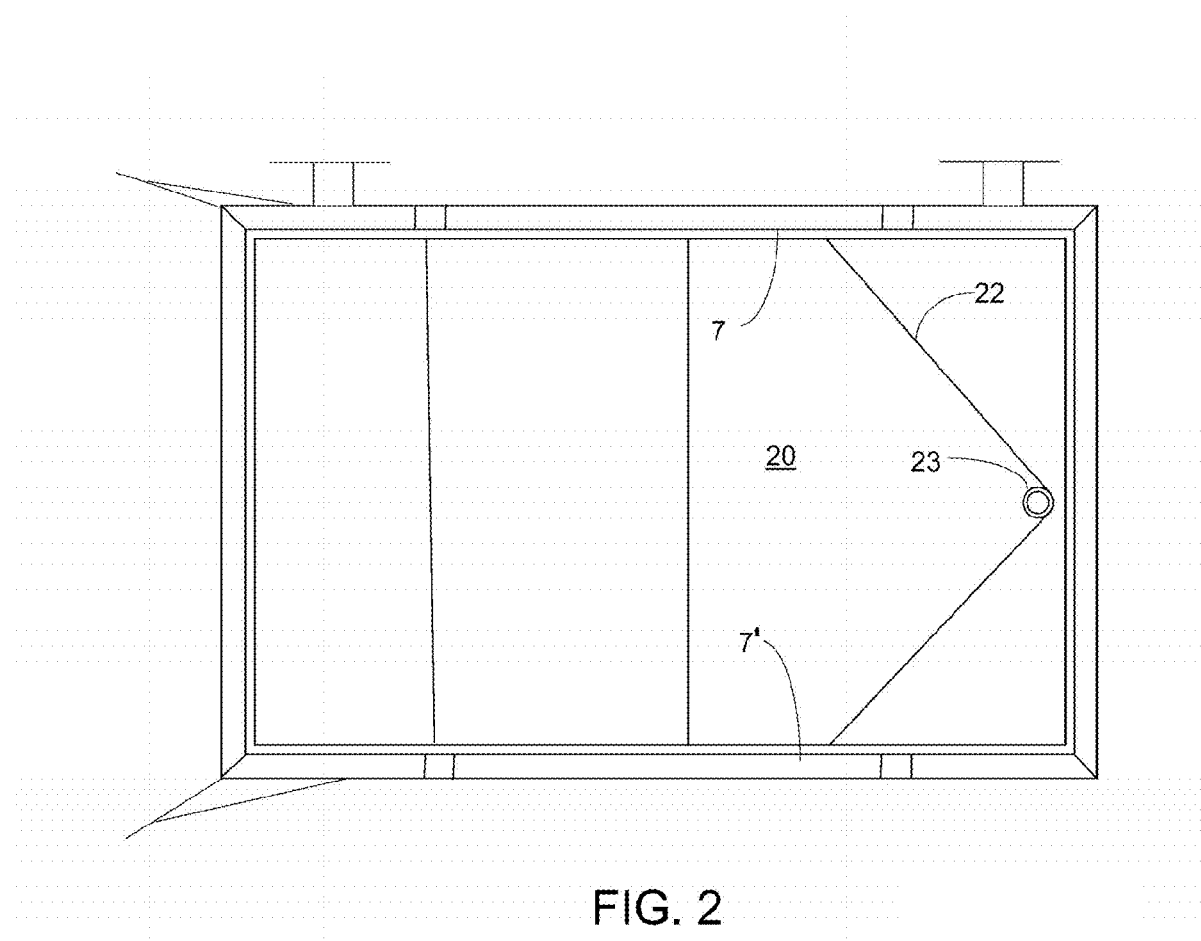
FIG. 2 is a top view of the invention of FIG. 1, showing the oil pickup wing including the radial front and tapered rear portion, forming a collection area.
Figure 3:
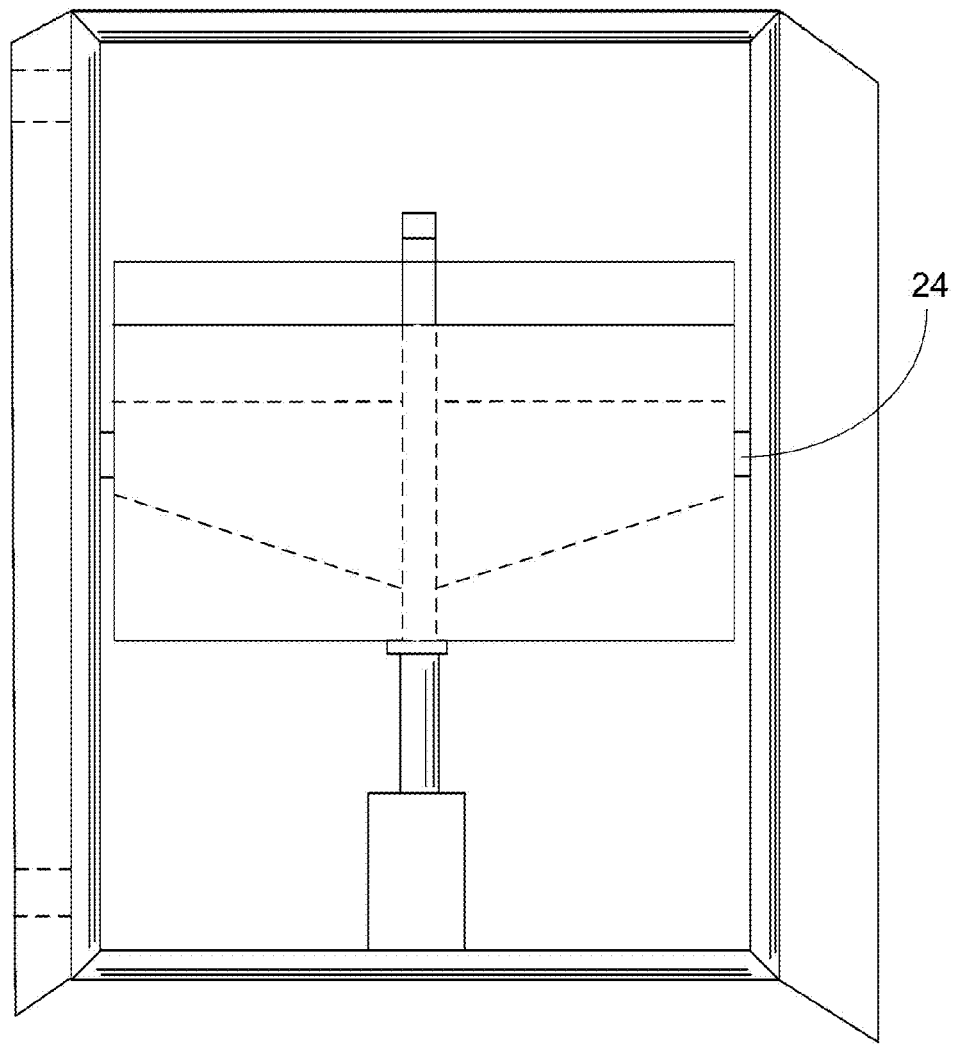
FIG. 3 is a frontal view of the invention of FIG. 1, showing the oil pickup wing situated in the system framework, the framework including first and second swing booms situated at opposing ends of the front of the frame, so as to direct the spill to the front of the wing.
Figure 4:
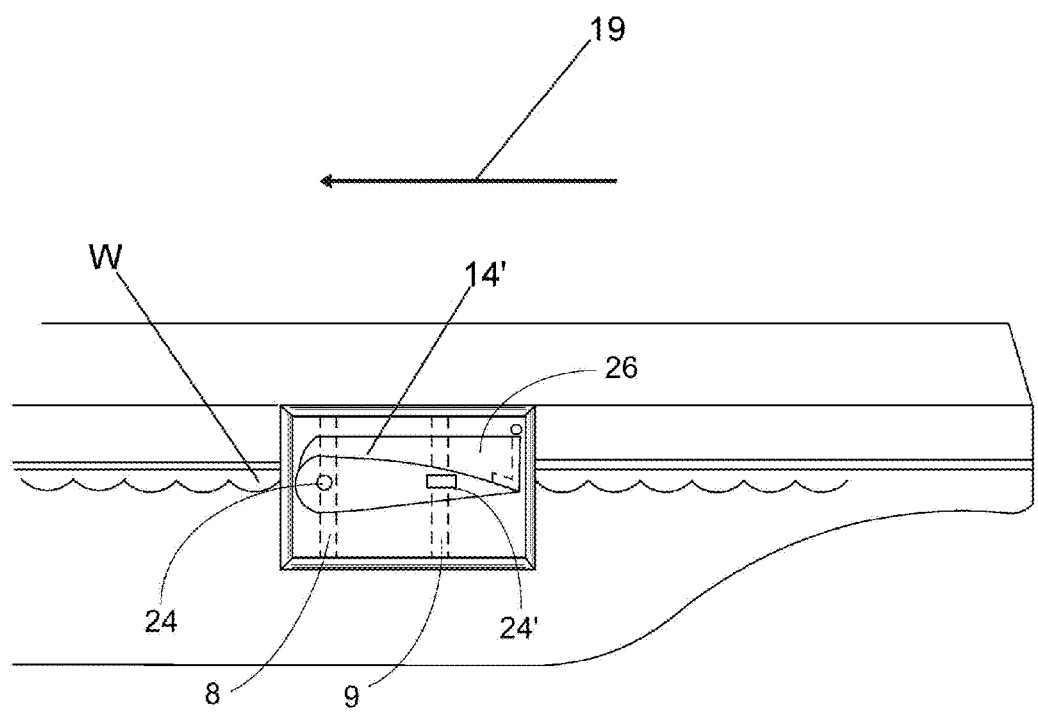
FIG. 4 is a side, cut-away view of the invention of FIG. 1 mounted to a marine vessel to retrofit same for spill collection, showing the oil pick-up wing at the waterline and supporting framework engaging the hull of the vessel.
Figure 5:
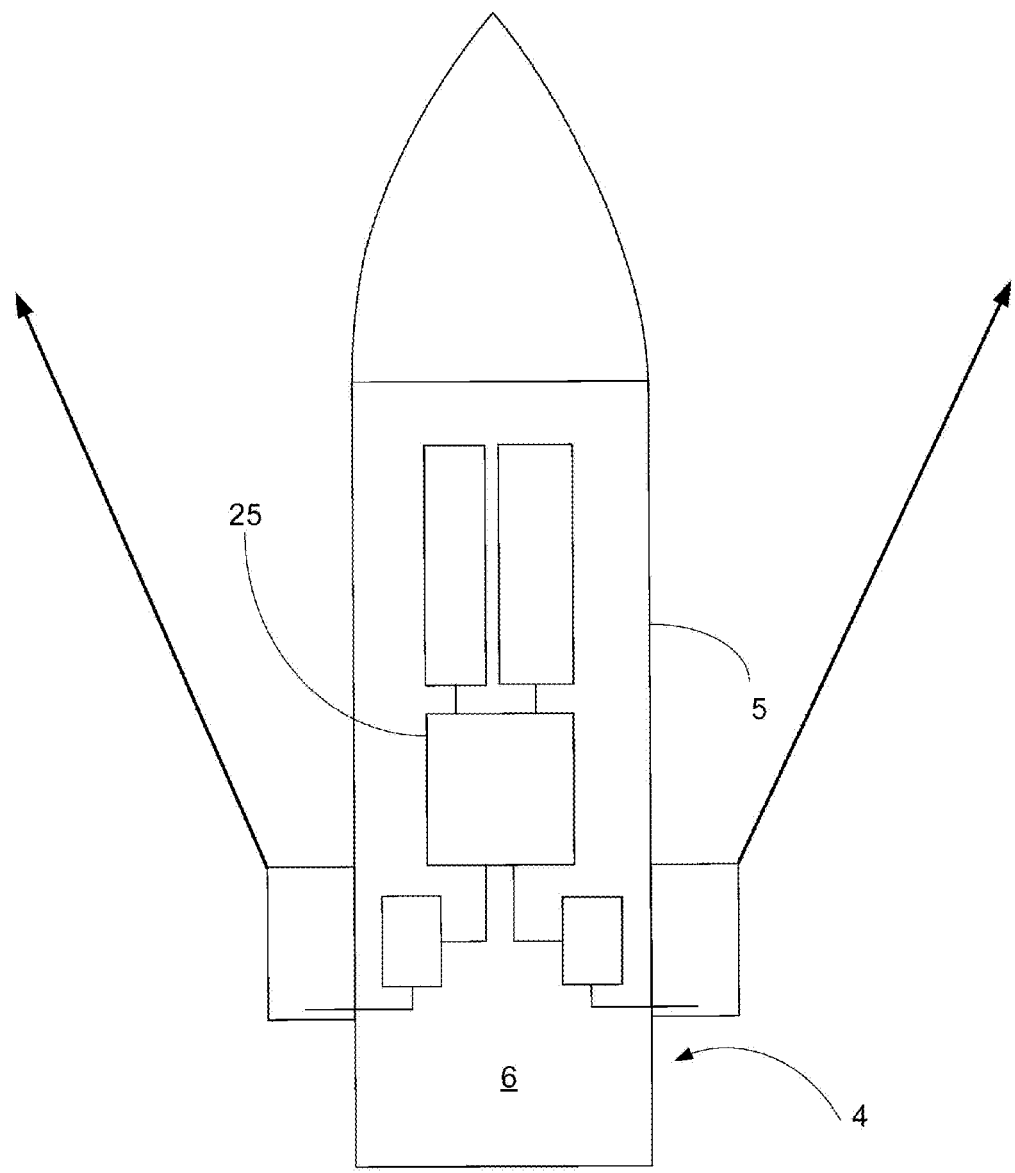
FIG. 5 is a top view of the invention of FIG. 4 as mounted to the marine vessel, illustrating the system of invention 1 mounted to opposing sides of the hull of the vessel, an exemplary oil separation system on the vessel, and opposing first and second floating collection booms being guided by independent first and second support vessels, respectively, in a collection operation.

FIG. 1A illustrates an alternative, uniformly proportioned "teardrop" configuration cross-sectional 29 pickup wing 31, having a radial front 30 and tapered rear 32.

Any wave action entering the pressure wave W forward the wing is dampened or dissipated, creating a smooth level surface at the wing, so as to provide a more precise skimming of the contaminate from the surface of the body of water being skimmed via the precise positioning of the wing so as to facilitate the contaminate being collected, with only a small amount of residual water, which is generally separated via conventional separation means from the contaminate.

In use, the wing is positioned via the hydraulic positioners (via operator or automated system) such that, as pressure builds on the pressure wave W, a thin layer of water begins to flow over the top 14' of the wing 2.

In an area with oil O in the surface of the water, this is exactly what is desired to carry oil or other contaminant from the water surface to the spill collection area 20 of the wing. By using the wing in this manner, one can minimize the amount of water taken in while maximizing the amount of oil collected.

The level and angle of the wing vis a vis the water surface can be operator controlled manually in "real time", or be controlled by a computerized leveling system, likewise in "real time" if desired, so as to adjust the wing to the forward speed of the vessel and the up and down pitching of the hull due to wave action, keeping the wing at its optimal operating height.

The spill collection area 20 forms a tapered surface 21 to the rear of the wing to provide the collection area, which drains to a tray 22 directing the fluid to a suction pipe 23, to allow the collected fluid, in the exemplary scenario, an oil-water mixture, which may be pumped via the suction pipe 23 from the wing to a separator system 25 located on the vessel to which the present system is mounted.

Allowing a thin layer of water to form over the deck D situated along the top 14' of said pickup wing during skimming operations is believed to facilitate efficient transport of skimmed contaminants over said wing and into a pickup or collection area 20. As shown in the Figures, deck D is situated along the top 14' of upper wing between said radial front end 10 and said tapered surface 21. The deck D has a gradual taper in wing thickness to collection area 20, where tapered surface 21 has a more substantial taper to the rear 21 end of the wing so as to accelerate the flow of skimmed contaminants to the pickup area, while collection area 20 is formed to temporarily hold contaminants prior to draining via suction pipe 23, maximizing the amount of contaminants collected.

Oil that is recovered through this system is then pumped into storage tanks in the vessel and the water is then pumped back over board, forward the collection wing, so that any remaining contaminant in the discharge may be again collected by the wing for reprocessing. During manual use, operators on board preferably will independently control the level of each wing mounted to each side of the vessel.

Upon receiving the call to begin oil cleanup, the boat will return to port and each wing will be installed along with pumps and a oil separation system and the necessary amount of pollution boom needed to complete the upgrade. Once the vessel reaches the spill site the booms will then be attached to the oil wing framework and 2 additional support vessels will then begin to tow the boom string forward at a 45 degree angle forward from the bow of the spill response vessel.

The area that can be cleaned up by this set up can be expanded by adding additional boom sections to the boom string that was originally brought out by the spill response. Additional boats outfitted like this working together will then have the capability of covering very large areas of the affected area and greatly reduce the amount of resources needed to effectively contain and cleanup any area that has been subjected to a large scale oil release.

The use of the wing in the present invention is found to produce a pressure wave similar to what one might observe when a nuclear submarine travels on the surface. It is believed that the present method of utilizing a pressure wave to disrupt turbulence on the water surface has never been used in oil spill cleanup operations.

| Listing of Elements | |
|---|---|
| # | Description |
| W | pressure wave |
| 2 | wing |
| 3 | framework |
| 4 | side of |
| 5 | hull |
| 6 | marine vessel |
| 7,' | opposing side edges of wing |
| 8,' | front track sections |
| 9,' | rear track sections |
| 10 | front of wing |
| 11 | rear of wing |
| 12 | first hydraulic positioner |
| 13 | 2nd hydraulic positioner |
| 14,' | underside, topside of wing |
| 15,' | rams |
| 16,' | extension, retraction of rams |
| 17 | pitch of wings |
| 18,' | wing up, down |
| 19 | vessel forward |
| 20 | spill collection area of wing |
| 21 | tapered surface |
| 22 | tray |
| 23 | suction pipe |
| 24,' | rods extend from side of wing |
| 25 | separator system |
| 26,' | vertical opposing walls on wing |
| 27 | longitudinal axis |
| 28 | depth |
| 29 | cross-sectional |

-continued

| Listing of Elements | |
|---|---|
| # | Description |
| 30 | radial front |
| 31 | pickup wing |
| 32 | tapered rear |
| / | |

After reviewing the technologies what were in use during the BP oil spill off the coast of Louisiana, it became apparent that most of the systems depended on a weir system to operate and could only operate in ideal sea conditions. Every system being used had to cease operations when the wave action became 18 inches or higher. This was a serious flaw in their designs that allowed thousands of barrels of crude oil to escape and come ashore and caused even more damage to the environment.

The wing/skimmer module system being presented now solves the wave action problem by using water pressure to control the surface of the water and creating a controlled environment in which skimming operations can be achieved even in heavy sea conditions.

It is noted that the cross-sectional configuration of the pickup wing 2 may vary depending upon the application; for example, the wing may comprise a balanced teardrop cross sectional configuration, and/or the thickness or depth 28 of the wing may vary as shown in the drawings, or uniformly taper in a more linear fashion from a thick front 10 edge to a thin rear 11 edge.

Theoretically, oil cleanup operations can be maintained in most sea condition depending on the cross section, length and the forward speed of the wing being used on a particular vessel.

By using the wing in this configuration, the faster the wing moves through the water the greater the pressure becomes on the wave action of the water body in the vicinity of the wave front in the cleanup area.

With the system of the present invention having a high forward speed and the ability to control the surface of the sea inside it's pickup area, the present invention provides the industry for the first time, ever a truly effective oil spill cleanup capability.

Also, the relatively low cost of this system along with it's adaptability to most vessels afloat, means that oil spills can now be remediated by a fleet of skimmers. This was never before thought possible due to the high operating cost and slow response times of systems that are now available.

The invention embodiments herein described are done so in detail for exemplary purposes only, and may be subject to many different variations in design, structure, application and operation methodology. Thus, the detailed disclosures therein should be interpreted in an illustrative, exemplary manner, and not in a limited sense.

What is claimed is:

1. The method of fitting a marine vessel having first and second sides and a hull for skimming operations to remove contaminants from a water surface, comprising the steps of:
   a. providing a first skimmer module, comprising:
      a first skimmer having a front and a rear, first and second sides, and upper and lower surfaces, said first skimmer section comprising a first pickup wing comprising a radial front having a symmetrical profile, a rear edge, and an upper surface, said upper surface of said pickup wing forming a collection area adjacent to said rear edge of said pickup wing, and a deck area formed between said radial front and said collection area, said deck area formed to provide a gradual taper in wing thickness to said collection area, said deck area formed so as to engage fluids flowing over said radial front and facilitate flow of same to said collection area, said collection area being more tapered than said deck area to retain fluids flowing thereto;

a frame for receiving said first skimmer section;

said first skimmer section engaging said frame so as to facilitate real-time positioning of said front edge and upper surface of said first skimmer section;

b. mounting said first skimmer module to said first side of said marine vessel;

c. propelling said marine vessel along a water surface to facilitate said marine vessel and said skimmer section traversing said water surface;

d. positioning said front of said first skimmer section at said water surface while traversing said water surface, thereby facilitating flow of contaminants thereupon and the collection of said contaminants therefrom and allowing said contaminants to flow over said radial front to engage said deck area, then flow to said collection area, where said contaminants are collected;

e. repositioning said first skimmer section in real time so as to maintain said front of said first skimmer section at about the water surface to collect contaminants floating thereupon.

2. The method of claim 1 wherein after step "e" there is further provided the additional step "ei" of utilizing said radial front of said pickup wing to create a pressure wave in said water surface in front of said first pickup wing as said first pickup wing moves forward thru the water surface to dissipate any wave action entering the pressure wave, creating a smooth level surface in front of said first pickup wing, to facilitate controlled flow of skimmed fluid to said deck area of said first pickup wing.

3. The method of claim 1 wherein step "e" there is further provided the additional step "e1" of utilizing said radial front of said first pickup wing to create a pressure wave in said water surface in front of said first pickup wing as said radial front of said first pickup wing traverses forward along the water surface, to dissipate any wave action entering the pressure wave, creating a smooth level surface in front of said first pickup wing, to facilitate controlled flow of skimmed fluid to said deck area of said first pickup wing.

4. The method of claim 3, wherein, after step "e1" there is further provided the added step "e2" of utilizing movement of said pickup wing traversing the water surface to form a thin layer of water over the deck area of said first pickup wing, facilitating flow of skimmed contaminants suspended by said thin layer of water over said first pickup wing to engage said deck area then flow to said collection area, and utilizing said collection area to temporarily store the contaminants collected.

5. The method of claim 4, wherein said deck area forms a gradual taper from front to rear, and said collection area forms a greater taper from front to rear than said deck area.

6. The method of claim 5, wherein said first pickup wing is positioned by a computerized leveling system configured to adjust said first pickup wing to compensate for forward travel and any up and down pitching due to wave action, and to keep said first pickup wing at an optimal skimming orientation vis a vis said water surface.

7. The method of claim 1, wherein after step "a", there is provided the additional step a(1) of:

providing a second skimmer module, comprising:

a second skimmer section having a front and a rear, first and second sides, and upper and lower surfaces, said second skimmer section comprising a second pickup wing comprising a radial front, a rear edge, and an upper surface, said upper surface of said second pickup wing forming a collection area adjacent to said rear edge of said pickup wing, and a deck area formed between said radial front and said collection area, said deck area formed to provide a gradual taper in wing thickness to said collection area, said deck area formed so as to engage fluids flowing over said radial front and facilitate flow of same to said collection area, said collection area being more tapered than said deck area to retain fluids flowing thereto;

a frame for receiving said second skimmer section;

said second skimmer section being positionable substantially within said frame so as to facilitate real-time positioning of said front edge and upper surface of said second skimmer section;

and wherein, after step "b", there is provided the additional step b(1) of:

mounting said second skimmer module to said second side of said marine vessel opposite said first skimmer module;

and wherein, after step "d", there is provided the additional step d(1) of:

positioning said front edge of said second skimmer section at said water surface;

and wherein, after step "e", there is provided the additional step e(1) of:

repositioning said second skimmer section in real time so as to maintain said front of said second skimmer section at about the water surface to collect contaminants floating thereupon, allowing said contaminants to flow over said radial front to engage said deck area, then flow to said collection area, where said contaminants are collected;

and wherein, after step "e(1)", there is provided the added step f. of:

repeating steps c-f to facilitate collection of contaminants from said water surface in the vicinity of said first and second sides of said marine vessel, respectively.

8. The method of claim 7 wherein in step "e1" there is further provided the additional step "e2" of utilizing said radial front of said pickup wing to create a pressure wave in said water surface in front of said second pickup wing as said second pickup wing moves forward thru the water surface to dissipate any wave action entering the pressure wave, creating a smooth level surface in front of said second pickup wing, to facilitate controlled flow of skimmed fluid of said deck area of said second pickup wing.

9. The method of claim 8, wherein, after step "e2" there is further provided the added step "e2i" of forming a thin layer of water over the upper surface of said second pickup wing so as to facilitate efficient transport of skimmed contaminants over said second pickup wing.

10. The method of claim 9, wherein said second pickup wing is positioned by a computerized leveling system configured to adjust said second pickup wing to compensate for forward travel and any up and down pitching due to wave action, so as to keep said second pickup wing at an optimal skimming orientation vis a vis said water surface.

* * * * *